Dec. 3, 1935.  D. T. MAY  2,022,968

FREQUENCY CHANGING SYSTEM

Filed Nov. 23, 1933

INVENTOR
D. T. MAY
BY E. V. Griggs
ATTORNEY

Patented Dec. 3, 1935

2,022,968

UNITED STATES PATENT OFFICE 2,022,968

FREQUENCY CHANGING SYSTEM

David T. May, Port Washington, N. Y., assignor to Bell Telephone Laboratories, Incorporated, New York, N. Y., a corporation of New York Application November 23, 1933, Serial No. 699,477

10 Claims. (Cl. 172—281)

This invention relates to a frequency changing system and more particularly to means for transforming the frequency of an alternating current into a multiple thereof.

An object of this invention is the production of harmonics of alternating currents.

A more particular object of this invention is the transformation of alternating current efficiently and economically into currents having three times the frequency thereof.

In certain electrical systems the use of static type frequency multipliers is highly advantageous. Heretofore devices of this type usually involved the employment of relatively expensive space discharge devices or transformers, the windings of which were arranged or the cores of which were polarized so that harmonics of an applied alternating current were produced.

In accordance with this invention the non-rectilinear voltage current characteristic of certain materials are utilized to produce harmonics of alternating currents. Materials such as the mixtures described and produced in accordance with the method disclosed in U. S. Patent 1,822,742, granted to K. B. McEachron on September 8, 1931, possess this non-rectilinear voltage current characteristic. One of these materials is known commercially as thyrite.

When an alternating electromotive force is applied across a material having this property, in series with an element having a linear voltage current characteristic, the ratio of the instantaneous potential across the material and that across the element varies with the intensity of the applied electromotive force. The potentials existing across both the material and the element may be so combined that harmonics of the applied electromotive force may be obtained. For example, if one set of conjugate arms of a Wheatstone bridge comprises elements consisting of materials having a non-rectilinear voltage current characteristic and the other set of arms comprises impedances having linear voltage current characteristics, the potential existing across the output of the bridge varies with the intensity of the electromotive force applied to the input. The potential of the output circuit of the bridge depends upon the ratio of the potentials across the material and that across the linear impedance. This ratio in turn depends upon the intensity of the applied electromotive force. By properly choosing the ohmic resistance value of the material employed with respect to the intensity of the applied electromotive force, harmonics of the applied alternating voltage are produced in the output of the bridge. Another means for combining the potentials existing across a material having a non-rectilinear voltage current characteristic with that across a linear impedance is a circuit including an inductively coupled transformer. In a manner similar to that resulting from the Wheatstone bridge, the potential existing across an element consisting of a material having a non-rectilinear voltage current characteristic is combined with that existing across a linear impedance by a lattice network, one of the arms of which comprises a material having a non-rectilinear voltage current characteristic.

The invention may be more fully understood by reference to the accompanying drawing in which.

Figure 1:
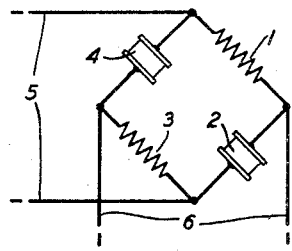
Fig. 1 represents a simple embodiment of the invention.

In Fig. 1 the numerals 1, 2, 3 and 4 designate the impedance elements of a Wheatstone bridge. The conjugate arms 2 and 4 comprise elements consisting of a material having a symmetrical non-rectilinear voltage current characteristic. Any material, such as that described in the above mentioned patent to McEachron, which possesses this characteristic, is desirable for this purpose. Finely divided semi-conductive crystalline particles held in random contact in a binding matrix of insulating material have been found satisfactory. The specific material employed comprises finely divided silicon carbide in a matrix of clay prepared in accordance with the method described in the patent to McEachron. The other two impedance elements 1 and 3 of the bridge comprise non-inductive ohmic resistances.

The alternating electromotive force, the harmonics of which are desired, is applied across opposite terminals of the bridge by the input circuit 5, while the harmonics are produced in the output circuit 6. The potential drop across the output of the bridge depends upon the relative ratios of impedance elements 1 and 2 with 4 and 3. Since impedance elements 2 and 4 have a non-rectilinear voltage current characteristic, these ratios vary with the momentary intensity of the electromotive force applied across the input circuit 5.

Figure 5:
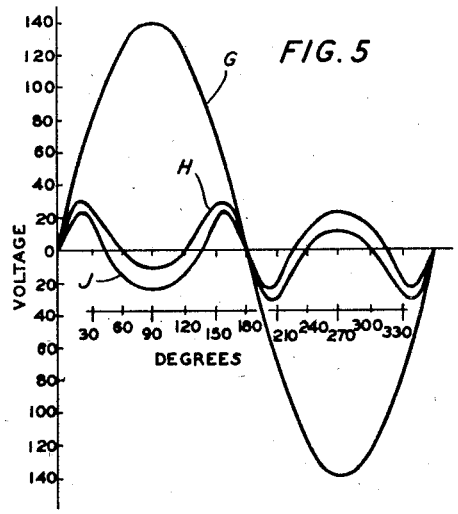
Figs. 4, 5 and 6 are curves which demonstrate the principle of this invention.
Figure 4:
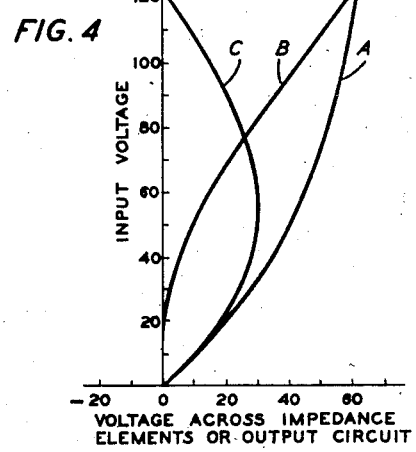

The principle and operation of the network is illustrated by referring to Figs. 4 and 5. Fig. 4 shows the voltage characteristics of the output circuit of the bridge and that across each of the elements of the bridge upon the application of a 60 cycle alternating electromotive force having a maximum intensity of 140 volts. Fig. 5 shows the relationship between the electromotive force applied across the input of the bridge and the resulting potential difference across the output circuit for a complete cycle of the applied electromotive force.

In Fig. 4, curve A represents the potential across each of the impedance elements 2 and 4, while curve B represents the potential existing across each of the ohmic impedance elements 1 and 3. Curve C shows the difference between curves A and B and represents the electromotive force produced across the output circuit 6.

In the particular application of the invention illustrated by these curves, the elements 1 and 3 are equal non-inductive resistances and the characteristics of the elements 2 and 4 consisting of the material having the non-rectilinear voltage current characteristic are substantially identical. Further, the ohmic resistance values of the non-inductive resistance elements 1, 3 are so chosen that they equal the ohmic resistance values of the elements 2, 4 when an electromotive force having an intensity of 122 volts is applied across the input 5 of the bridge. With an electromotive force having an intensity of 122 volts applied to the input circuit 5 of the bridge, the ratio of the potential across the linear resistance element 1 and that across the non-rectilinear element 2 is equal to the ratio of the potential across the linear resistance element 4 and that across the non-rectilinear element 3. The alternating electromotive force applied to the input circuit 5 of the bridge is a 60 cycle alternating voltage having a maximum intensity of 140 volts. This alternating voltage has a momentary intensity of 122 volts at one sixth of a completed cycle.

When this 60 cycle alternating electromotive force is applied across the input circuit, the distribution of potential across the elements 1 and 2 as well as that across the elements 4 and 3 varies with respect to the momentary intensity of the applied electromotive force. During the positive half of the cycle, for example, the potential across the element 2 or 4 as shown by curve A of Fig. 4 is greater than that across the element 1 or 3, shown in curve B, as the electromotive force applied to the input circuit is increased from zero to 122 volts. The difference in these potentials produced across the output circuit 6 and represented in Fig. 4 as curve C is positive within this range. When the applied electromotive force attains an instantaneous intensity of 122 volts, the relative ratio of the instantaneous potential across the non-inductive resistance element 1 and that across the element 2 is equal to the ratio of the instantaneous potential across the element 4 and that across the element 3 and no potential exists across the output circuit. As the magnitude of the applied electromotive force increases from 122 volts to the maximum of 140 volts, the potential across 2 or 4 is less than that across 1 or 3. As a consequence, the resultant potential difference across the output circuit 6, shown in curve C, reverses its direction. When the intensity of the applied electromotive force decreases from 140 volts to 122 volts, the resultant potential across the output circuit decreases negatively until at 122 volts, it is zero. Since from 122 volts to zero of the applied electromotive force, the potential across the element 2 or 4 as shown in curve A is greater than that existing across element 1 or 3, represented by curve B, the resultant potential across the output circuit 6 is positive as indicated by curve C. Since the non-rectilinear elements are symmetrical, the same correlation exists between the applied electromotive force and the resultant potential across the output circuit for the negative half of the cycle of the applied electromotive force. The resultant potential, however, is opposite in direction to that of the positive half of the cycle. The relationship between the applied electromotive force and the resulting potential difference across the output circuit is shown in Fig. 5.

In Fig. 5, curve G represents the applied electromotive force and curve H shows the resulting difference of potential across the output terminals of the bridge. From the start to approximately one-twelfth of the completed cycle of the applied electromotive force, the resulting potential difference across the output circuit 6 increases positively. From that point, the potential difference across the output circuit decreases positively until it is zero at one-sixth of the completed cycle of the applied electromotive force. The potential across the output circuit increases negatively from one-sixth to one-quarter of the completed cycle of the applied wave and then decreases negatively until at one-third of the completed cycle it again is zero. In this manner, a harmonic having triple the frequency of the applied wave is produced.

Figure 2:
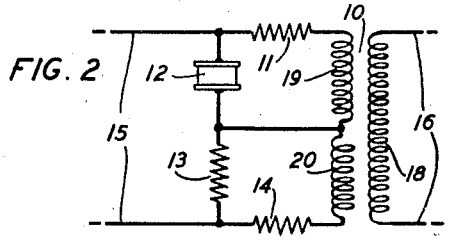
Fig. 2 illustrates a modification of the invention in which an inductively coupled transformer is employed.

In Fig. 2, the numeral 18 represents the secondary winding of the inductively coupled transformer 10. The windings 19 and 20 are wound in opposition and constitute the primary of the transformer 10. Across the line 15 an element 12 comprising a material having a symmetrical non-rectilinear voltage current characteristic is connected in series with a non-inductive ohmic resistance 13. One side of the line is connected to one side of the winding of coil 19, while the other side of the line is connected to one side of the winding of coil 20. Between these connections and the series shunt 12, 13 two ohmic resistances 11 and 14 are respectively inserted. At a point between the ohmic resistance 13 and the element 12, the other sides of the winding 19 and 20 are connected.

The result obtained by the use of this modification is similar to that described for the bridge network of Fig. 1. The magnitude of the electromotive force passing through the winding 19 is determined by the potential across the element 12 comprising the material having the symmetrical non-rectilinear voltage current characteristics, while that of the winding 20 is determined by the potential across the resistance 13.

If the value of the elements 12 and 13 are the same when the intensity of the applied electromotive force has attained one-sixth of a complete cycle, a wave having triple the frequency results. The principle of the production of the harmonic of the applied electromotive force is similar to that graphically illustrated in Figs. 4 and 5. Curve A represents the potential across the winding 19, curve B the potential across the winding 20 and curve C the voltage across the secondary winding 18 when a 60 cycle alternating electromotive force having a maximum intensity of 140 volts is applied across the line 15.

In this specific example the element 13 is a 70 ohm non-inductive resistance.

Figure 6:
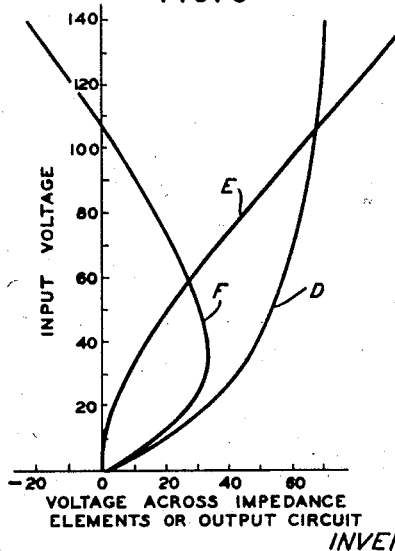

An illustration of the different types of harmonics that may be produced is shown in Fig. 6. If the resistances of the elements 12 and 13 are equal when the applied electromotive force attains the root mean square value, a wave also having a triple frequency but differing in wave form from that illustrated in Fig. 4 is produced. Curve D of Fig. 6 represents the potential across the winding 19 upon the application of 60 cycle alternating electromotive force having a maximum intensity of 140 volts across the line 15, curve E the potential difference across the winding 20 and curve F, the potential difference across the winding 18. In Fig. 5, the resulting multiple is represented as curve J. The applied alternating electromotive force wave appears as G. Other wave forms may be produced by varying the ratio of values of the non-inductive resistances and the materials having the non-rectilinear voltage current characteristic in relation to the applied alternating electromotive force.

Figure 3:
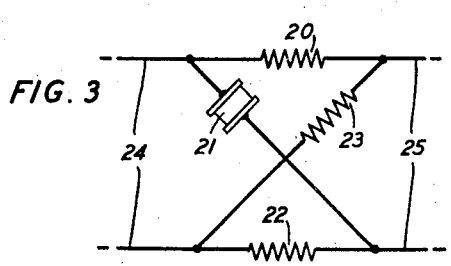
Fig. 3 shows another modification of the invention for the production of harmonics having magnitudes different from those produced by the devices shown in Figs. 1 and 2.

In Fig. 3 a lattice network comprising the impedance elements 20, 21, 22 and 23 is shown. Line 24 is connected to the input of the network and line 25 is connected to the output circuit of the network. One of the impedance elements of the network, 21, comprises a material, e. g. thyrite, having a non-rectilinear voltage current characteristic. The other impedance elements 20, 22 and 23 comprise non-inductive ohmic resistances.

If the values of resistances of elements 20, 22 and 23 are equal and if the values of the resistances of elements 21 and 22 are equal at one-sixth of a complete cycle of the applied electromotive force, a triple frequency wave somewhat similar to that shown as curve H shown in Fig. 5 is produced; while if the value of the elements 22 and 21 are equal at the root mean square magnitude of the applied electromotive force a wave similar to the frequency of curve J of Fig. 5 results. However, the magnitude of the waves of the resulting harmonics is approximately one-half of that produced by the Wheatstone bridge if the same non-rectilinear element is employed. By providing two or more of these devices harmonics of a higher order may be supplied.

It is to be understood that the networks and transformers described are illustrative of the invention but that its scope is not limited to these circuits. Other circuit arrangements employing a material having a non-rectilinear voltage current characteristic may also be used for the production of harmonics.

What is claimed is:

1. A frequency multiplier comprising a material, the resistance of which varies instantaneously as a function of the current passing therethrough.

2. A frequency multiplier comprising a network, one element of said network comprising a material, the resistance of which varies instantaneously as a function of the current passing therethrough.

3. In combination, an element having a constant voltage current characteristic in series with an element comprising a material, the resistance of which varies instantaneously as a function of the current passing therethrough, means for applying a potential across said elements and means for combining the potentials across the respective elements and applying the resulting potential to an output circuit.

4. A device for converting the frequency of alternating currents comprising an inductively coupled transformer, said transformer comprising input and output circuits, an ohmic resistance element in series with an element comprising a material, the resistance of which varies instantaneously as a function of the current passing therethrough, said elements being in shunt with said input circuit, a source of alternating current connected to said input circuit, and means for combining the current passing through said elements for the conversion of the frequency of said alternating current into said output circuit.

5. A frequency multiplier comprising a transformer, a network associated therewith and an element in said network comprising a material, the resistance of which varies instantaneously as a function of the current passing therethrough.

6. In combination, a transformer, the primary of said transformer being divided into two sections which are wound oppositely and a material, the resistance of which varies instantaneously as a function of the current passing therethrough, connected to one of said sections.

7. In combination, a network comprising an element having a constant voltage current characteristic and an element comprising a material, the resistance of which varies instantaneously as a function of the current passing therethrough, means for passing a current through each of said elements, and means for combining the outputs of each of said elements to produce a harmonic of the applied current.

8. In combination, a transformer, a source of waves, means for applying said waves to said transformer, a network connected to the input circuit of said transformer, a material, the resistance of which varies instantaneously as a function of the current passing therethrough in said network, and means for deriving from said transformer a multiple of the frequency of said source of waves.

9. In combination, a transformer, a source of waves, means for applying said waves to said transformer, and means comprising a material, the resistance of which varies instantaneously as a function of the current passing therethrough, for deriving from said transformer a multiple of the frequency of said source of waves.

10. In combination, a source of waves and means comprising a material, the resistance of which varies instantaneously as a function of the current passing therethrough, to produce harmonics of the frequency of said waves.

DAVID T. MAY.